Figure 1A:
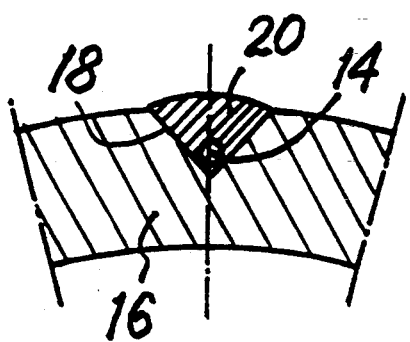

United States Patent [19]

Pelzer

[11] Patent Number: 5,415,242

[45] Date of Patent: May 16, 1995

[54] PROCESS AND DEVICE FOR MAKING AN ELECTRICALLY CONDUCTING CONNECTION BETWEEN CABLE DUCTS

[75] Inventor: Rudolf Pelzer, Herzogenrath, Germany

[73] Assignees: Kabelwerk Eupen AG; Cablerie d'Eupen S.A.; Kabelfabriek Eupen N.V., all of Eupen, Belgium

[21] Appl. No.: 2,025

[22] Filed: Jan. 8, 1993

Related U.S. Application Data

[63] Continuation-in-part of Ser. No. 673,318, Mar. 22, 1991, Pat. No. 5,212,349.

[30] Foreign Application Priority Data

Mar. 23, 1990 [BE] Belgium ............................ 9000324

[51] Int. Cl.6 .......................................... H02G 15/24
[52] U.S. Cl. ................................. 174/21 R; 29/860; 29/868; 174/21 C; 174/98
[58] Field of Search ............... 29/860, 868; 174/21 R, 174/21 JS, 21 C, 68.2, 96, 98, 84 R, 84 S

[56] References Cited

U.S. PATENT DOCUMENTS

| | | | |
|---|---|---|---|
| 2,008,288 | 7/1935 | Malone | 174/96 |
| 4,025,717 | 5/1977 | Whittingham | 174/84 R |
| 4,528,419 | 7/1985 | Charlebois et al. | 29/868 |
| 4,949,319 | 8/1990 | Boeglin et al. | 174/84 R |
| 5,191,292 | 3/1993 | Klotz et al. | 29/868 |

*Primary Examiner*—P. W. Echols
*Attorney, Agent, or Firm*—Leydig, Voit & Mayer

[57] ABSTRACT

In a process and device for making an electrically connection between two end sections of two cable ducts, each duct having one electrically conducting wire, embedded in a wall of the duct and enclosed on all sides it is suggested to fit a collar comprising separable elements around the end section of each cable duct, to connect the collars by an electrically conducting cable, to achieve electrical contact between the detector wire and the conducting cable and to clamp the separable elements together.

10 Claims, 5 Drawing Sheets

PROCESS AND DEVICE FOR MAKING AN ELECTRICALLY CONDUCTING CONNECTION BETWEEN CABLE DUCTS

This application is a continuation in part of my application Ser. No. 07/673,318 filed Mar. 22, 1991, now U.S. Pat. No. 5,212,349.

This invention relates to a process as well as to a device for making an electrically conducting connection between two sections of cable duets, each having at least one electrically conducting detector wire(s) embedded in the duct sheath.

In my copending application a cable duet of synthetic material is proposed, which duet is for laying in the ground and includes at least one electrically conducting detector wire placed at controlled depth in the wall of the duet. According to this application a wire receiving groove is made parallel to the axis of the duet, a metallic detector wire is placed in the groove and a filler material is put in the groove and welded to the duct sheath so that the detector wire is enclosed on all sides. By using this technique the metallic wire is placed with great accuracy within the cable duet so that correct detection of the wire with simple means becomes easy.

This application relates to a process and a device for making an electrically conducting connection between the metallic wires of two sections of cable duets, in particular sections of cable ducts having a detector wire embedded in the duet jacket and enclosed on all sides. Such a process and device are necessary in order to connect joints between successive cable duet sections in an electrically conducting manner, by bridging any branches, couplings, elbows or such like in the joint as necessary.

According to the invention the process for making an electrically conducting connection between sections of cable ducts, each duct having at least one electrically conducting detector wire embedded in a wall of the duct and enclosed on all sides, comprises the following steps:
  fitting a collar comprising separable elements around the end section of each cable duct;
  placing a conducting cable between the collars of both sections and introducing the conducting cable inside the collars;
  achieving electrical contact between the detector wire in each section and the conducting cable;
  enclosing the electrical contact by placing a sealing material inside the collar;
  clamping the separable elements together.

According to the invention, the connector has two collars, each of which has two separable elements which close round one of the duct sections concerned, where each collar makes contact with the detector wire, and where each has at least one electrically conducting cable in order to make an electrically conducting connection between one contact in one of the two collars, and one contact in the other collar.

According to a first embodiment of the invention each collar includes a knife contact which cuts into the duct jacket and makes contact with the detector wire when the collar is fitted. Such a device is extremely simple to install, even by unskilled workers, since the electrical contact is made automatically when the particular collar is closed. At least one electrically conducting cable with sufficient length of preferably 1 m then connects the two collars.

In order to ensure a perfect electrical connection between the knife contact and the detector wire, the knife contact is according to an advantageous embodiment of the invention made with the help of a bush-knife, comprising a circular or partly circular cutting blade, so that two contact points at a given distance from each other are realized. The knife contact is made of brass or preferably of a special copper alloy, so that it is inexpensive to manufacture and also sufficiently hard to be able to penetrate the copper wire.

In order to protect the contact point from environmental influences, a sealing system is suggested, in order to outwardly seal the point of contact between the knife contact(s) and the detector wire.

To provide a simple manner of preventing moisture penetrating along the outer surface of the duet, it is suggested that the sealing system consist of a sealing ring applying tightly around the knife contact between the duct outer surface and the collar.

In order to seal the knife contact opposite the collar in the area of the connection to the electrically conducting cable, a corresponding ring is used in this area.

According to another embodiment of the invention the detector wire is freed from its enveloping plastic material at the area of the collar and the bridging conducting cable is soldered to the freed area of the detector wire. To this end the plastic filler material enclosing the detector wire is melted away over an appropriate axial length. The end of the bridging cable is stripped off, the stripped end is soldered to the detector wire and the connection is covered by plastic insulating compound.

To close the collar in a simple manner so that it can nevertheless bear a mechanical load, it is suggested that the collar, which is preferably in two parts, is closed around the outer surface of the duet by means of screw joints.

The collar can be made in inexpensive material and have high resistance to corrosion, for instance the collar can be made of plastic, preferably injection-moulded PVC.

Figure 1:
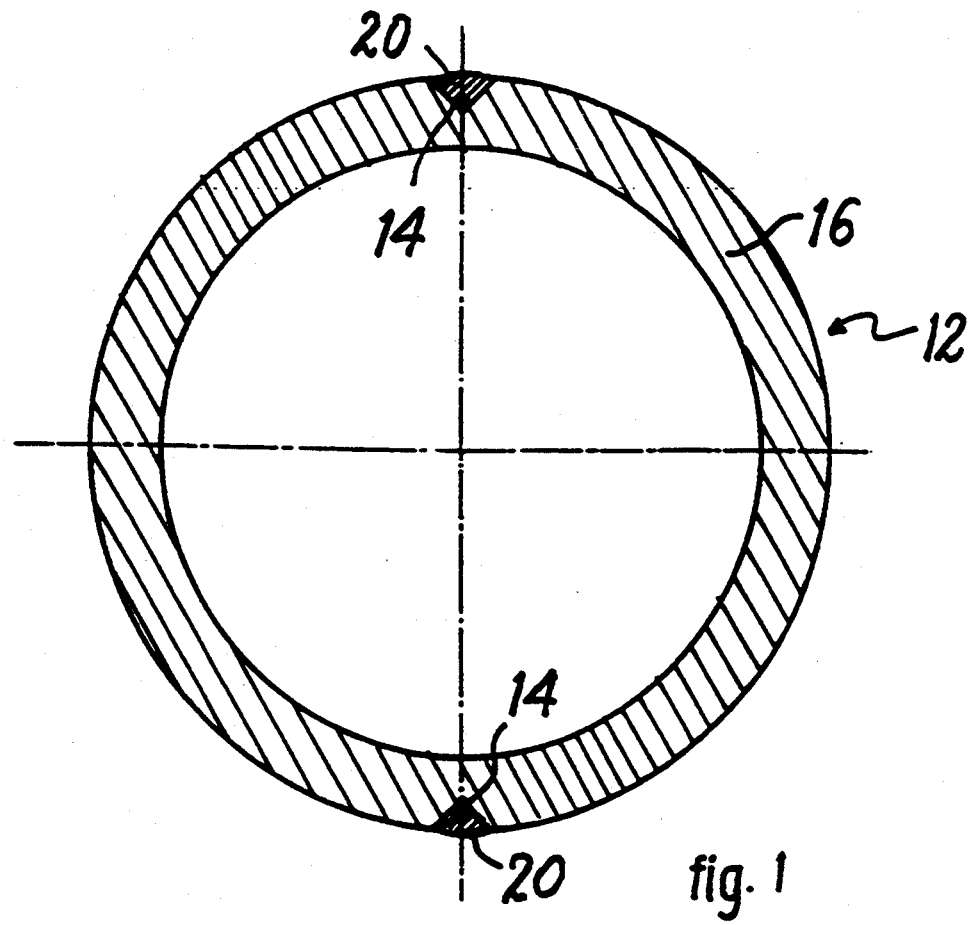
Figure 2A:
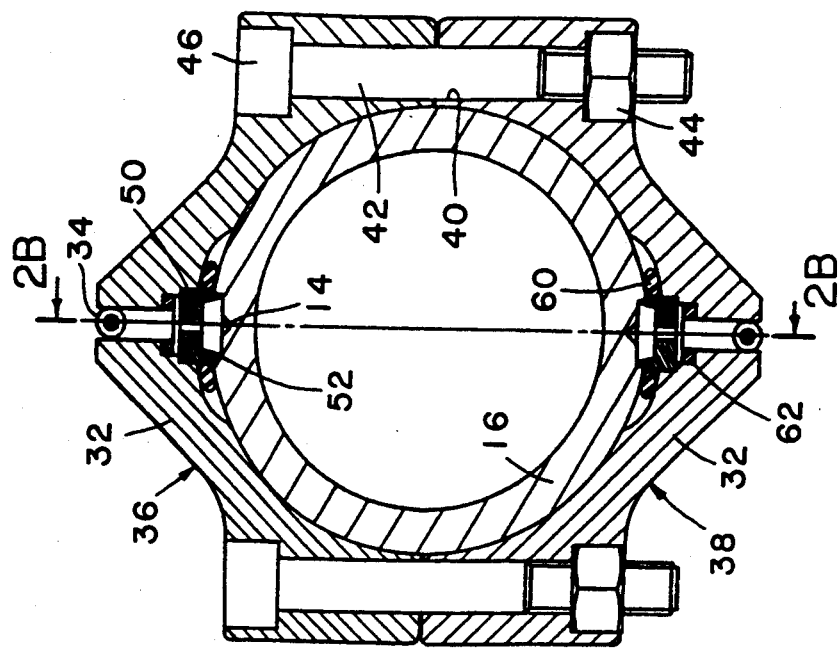
Figure 2B:
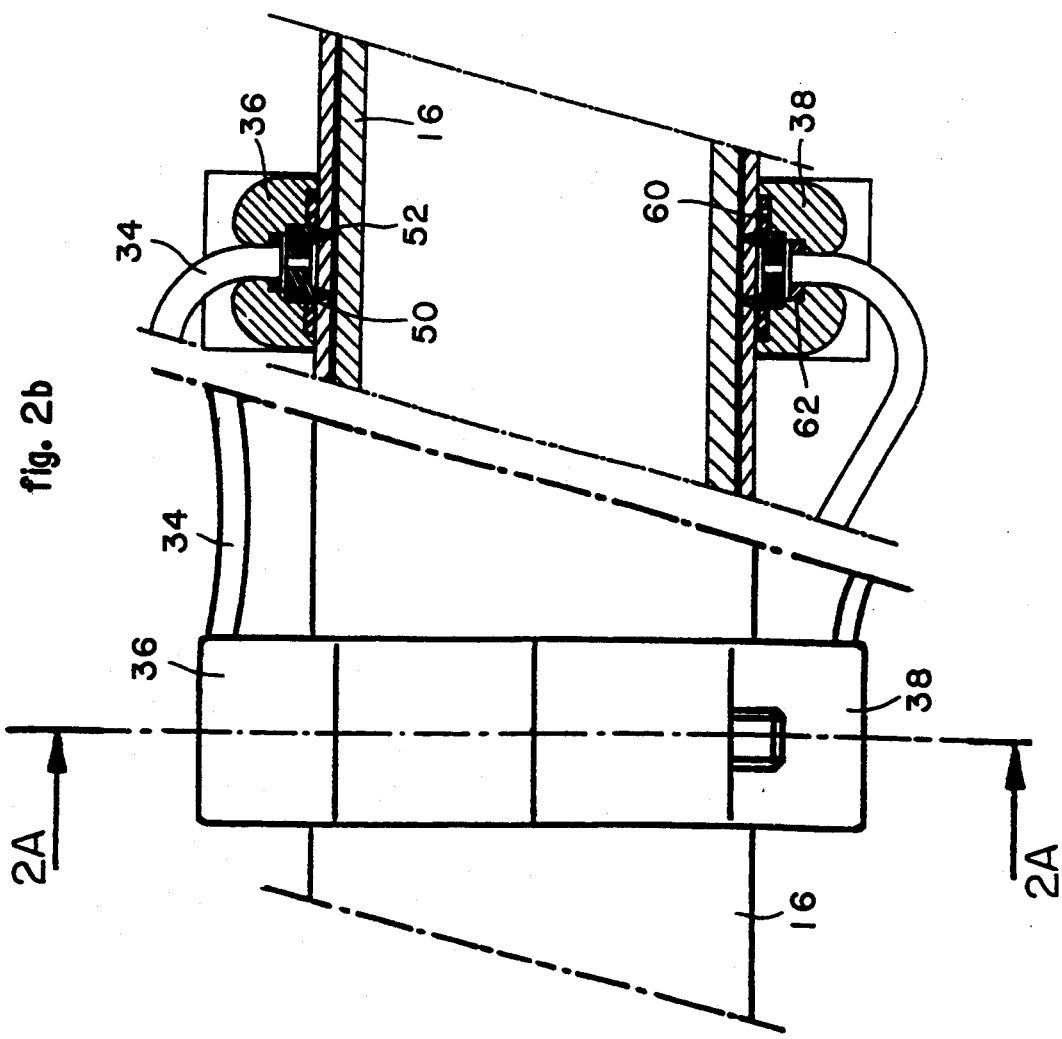
Figure 3A:
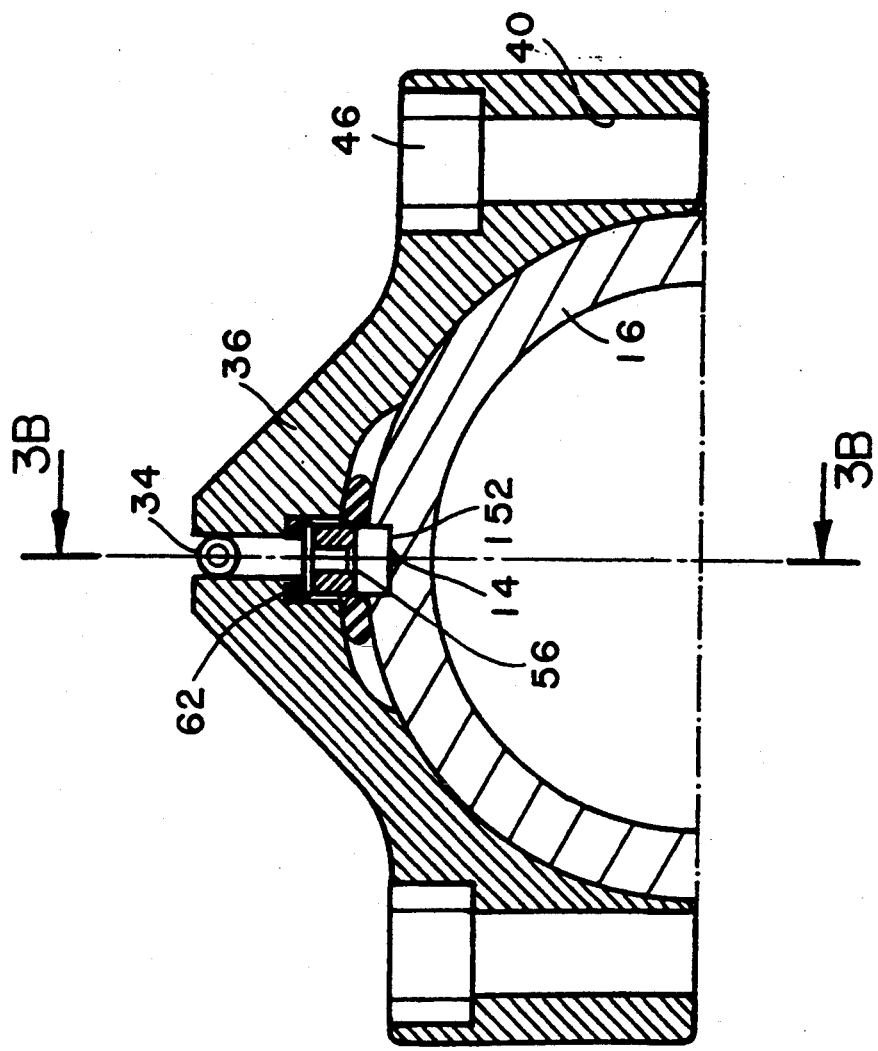
Figure 3B:
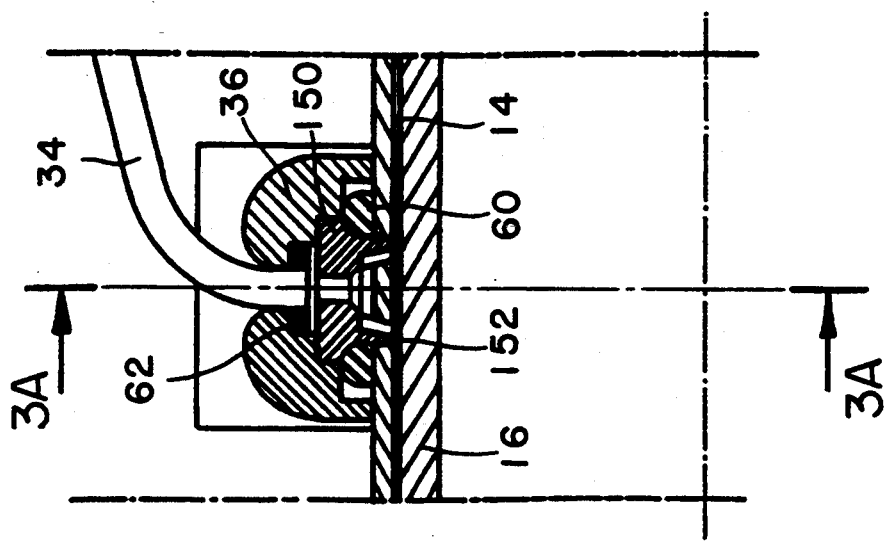
Figure 4A:
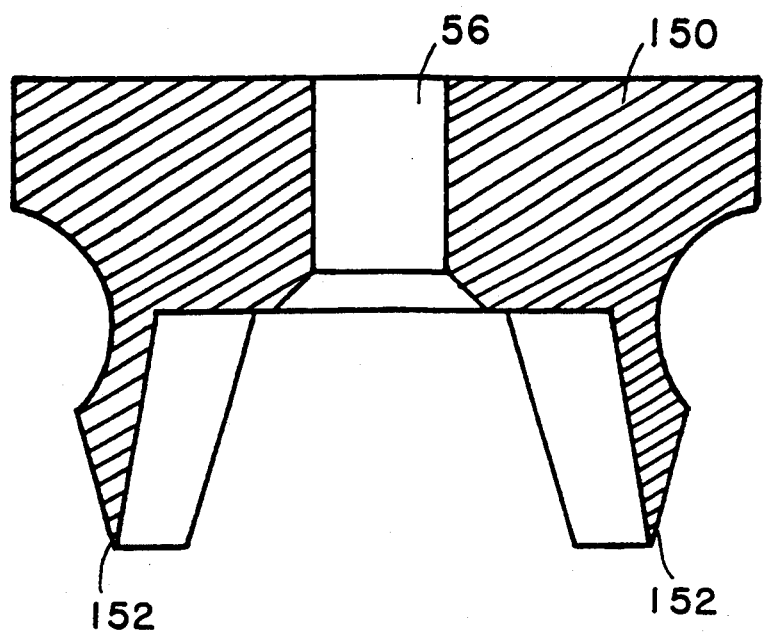
Figure 4B:
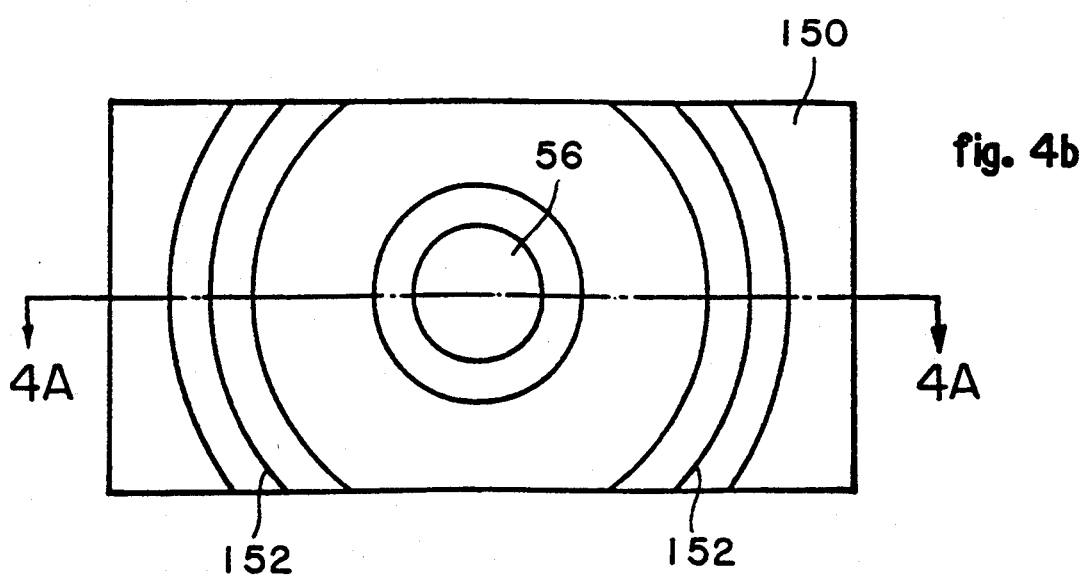
Figure 5A:
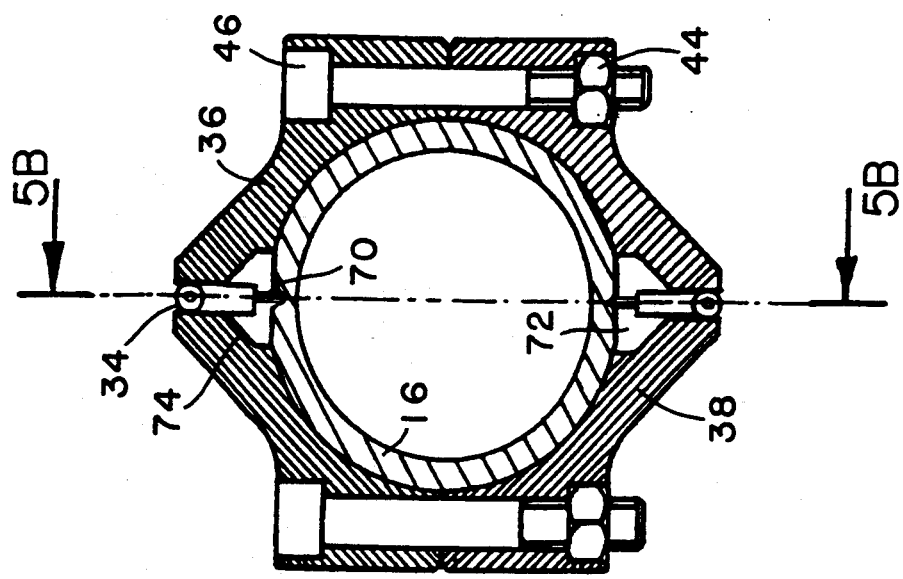
Figure 5B:
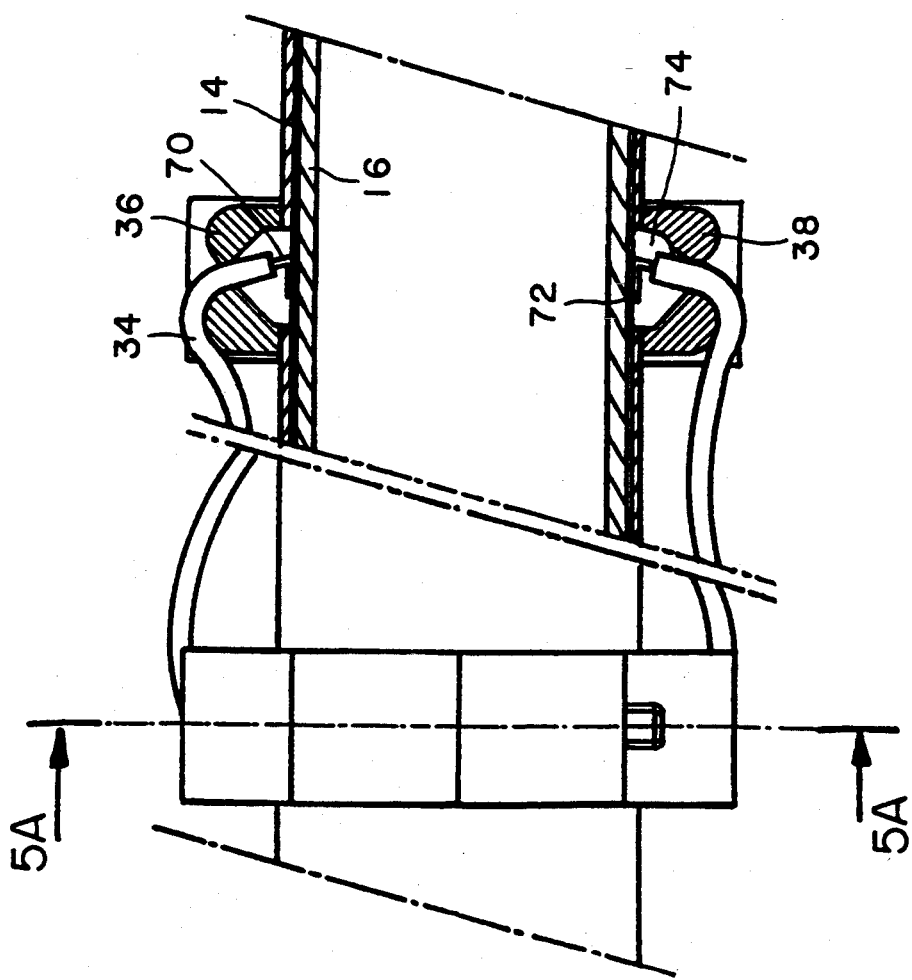

The invention is described below with the aid of several embodiment examples, showing:

FIG. 1: a cross section of a duct jacket to be connected;

FIG. 1a: is an enlargement of part of FIG. 1;

FIG. 2a: a section through a duct with a collar for electrical connection of two ducts according to a first example (section along line 2A—2A in FIG. 2b);

FIG. 2b: a section of the arrangement in FIG. 2a along line 2B—2B;

FIG. 3a: a section through a duct with a collar for electrical connection of two ducts according to a variation of the first example (section along line 3A—3A of FIG. 3b);

FIG. 3b: a section of the arrangement of FIG. 3a along line 3B—3B;

FIG. 4a: a section through the knife described in FIG. 3 (section along line 4A—4A of FIG. 4b);

FIG. 4b: a front view of the knife of FIG. 4a;

FIG. 5a: a section through a duct with a collar for electrical connection of two ducts according to a second example (section along line 5A—5A in FIG. 5b);

FIG. 5b: a section of the arrangement in FIG. 5a along the line 5B—5B.

FIG. 1 shows a cable duct 12, in particular for fibre optic cables provided with two detector wires 14 reliably embedded in the duct wall 16 and enclosed on all sides, so that they are protected against corrosion. The detector wires 14 being placed in a V-shaped groove 18 fashioned in the duct jacket 16 and afterwards filled with softened filler material 20.

On buried cable ducts 12 with one or two detector wires 14 of correspondingly great length, it is unavoidable for the cable duct to be interrupted at certain points in order to fit couplings, elbows, branches, and suchlike in the length of the cable. For this purpose, the cable duct 12 laid in a trench is cut at the corresponding point, and is shortened by the length of the fitting. Once the fitting has been installed, it must be bridged electrically, i.e. an electrically conducting connection must be made between the detector wires of the two sections of cable duct terminated in this way.

A device for bridging the fitting with an electrically conducting connection between the cable duct sections must meet the following criteria: the electrical connection in the ground must be ensured in the long term, since the cable duct must remain detectable for a practically unlimited time. The device must be extremely easy to fit, i.e. it must be capable of being fitted quickly, even by unskilled personnel, under the most difficult conditions of burial, with absolute certainty that it will work.

It is the object of this invention to propose a device which meets these requirements. FIGS. 2 to 5 show three embodiments of devices according to the invention, whereby the electrical contact is made in a different way. In both embodiments the device consists of two collars 32 and two insulated, electrically conducting cables 34. The two collars 32 are in these embodiments both identical.

Each collar 32 is made in two parts, with an upper part 36 and a lower part 38. The upper part 36 and lower part 38 can also be identical or similar.

Each part 36, 38 is more or less bridge-shaped in order to enclose the cable duct 16 over 180°. Each part, 36 and 38, has a hole 40 to take a threaded bolt 42. In order to take an hexagonal screw 44 or a bolt head 46, the hole 40 can have hexagonal recesses. The bolt head 46 of the threaded bolt 42 is in the form of a cylindrical hollow set screw, so that it can easily be turned, while the hexagonal nut 44 is being fitted in an hexagonal recess of the other part 38 when the collar 30 is being assembled. As soon as the two bolts 42 of one of the collars 32 have been assembled (bolt 42 and nut 44), the two parts 36 and 38 lie against the cable duct 16 and against each other (at the ends of the bridge). This gives a well-defined clamping pressure, which can simply be achieved, even by unskilled personnel. To facilitate stock keeping and assembly, the two hexagonal nuts 44 can be pressed into the hexagonal recesses of part 38. Locking after assembly is not necessary. As a result of the countermoment suddenly increasing when the two parts 36 and 38 come together as the screw joint is being tightened, it is practically impossible for the screw joint to be tightened too much.

According to the embodiment shown in FIGS. 2a and 2b, when the two parts are clamped together, a knife-bush or bushing contact 52 in each of the parts 36 and 38 cuts in a well defined manner into one or both of the detector wires 14 in order to make a permanent electrical contact between the detector wire 14 and bush-knife 50. Each bush-knife 50, due to its axially symmetrical shape, has a circular cutting blade and thus cuts in two separate points, at a given distance from each other in the detector wire 14, thus realizing two electrical knife-bush or bushing contacts 52. The knife-bush contacts 52 are made of a special copper alloy. One freed end of the cable 34 is soldered to each knife contact 52. The FIGS. 3a, 4a and 4b show a corresponding bore hole 56 in each knife-bush contact 52 to receive the conductor of the insulated cable 34.

Since each knife-bush contact 52 cuts through the wall material 20 of the cable duct 12 so that it bites into the detector wire 14, and thus removes the insulation of the detector wire 14 on the side facing outwards, a sealing system is fitted within each part 36 and 38, in order to provide an outer seal at the contact points. In this example, each sealing assembly consists of a sealing ring 60 between the cable duct 16 and cable collar 32, and a sealing ring 62 between the knife-bush contact 52, cable 34, and the corresponding part 36 and 38. The sealing rings can consist of simple O-rings. The sealing ring 62 in this way reliably prevents air or moisture penetrating along the cable 34 at the knife-bush contact 52. As a result, the system has long-term corrosion resistance. Since the bush-knife 50 penetrates into the copper detector wire 14 by a definite amount (forming a V-shaped notch), a relatively wide contact area is obtained, thus ensuring good electrical contact.

In order to enable large fittings to be bridged simply, the cables 34 can have for example a length of one meter.

Relating to FIGS. 3 and 4 they show a variation of the embodiment described in relation with FIG. 2.

For the simplicity of the description all parts shown in FIGS. 3 and 4 which are identical with parts shown in FIG. 2 are represented with the same reference numerals.

According to this embodiment the bush-knife 150 has not a complete circular section but has been cut off partly on both diametrically opposed sides thus forming two opposite arc-shaped knives, as can be clearly seen in FIG. 4b.

As a consequence, the knife-bush contact 152 cuts only through that part of the wall corresponding to the arc-shape of the bush-knife 150.

As the knife 150 is smaller than the knife 50 of the embodiment described with reference to FIG. 2, the cutting into the cable-duct is easier.

FIG. 5 shows an example whereby the electrical contact is made by soldering the bridging cable 34 to the detector wires 14. To this end the filler material 20 (which can be polyethylene) which forms a welded seam cover over the detector wires 14 is melted away at defined points over a length of approximately 10 to 15 mm so that window-like cut-outs are produced. Appropriately a soldering iron with, for instance, a soldering tip shaped for this purpose, can be used. Within these cut-outs the detector wire 14 (generally a copper wire) is freed and then preferably lifted, for instance with the help of a knife-tip, to free it over its entire surface. After suitable pretreatment, in view of the soldering of the respective two wire elements 14, the stripped ends 70 of the bridging cable 34, are bent through 90°, are placed on the corresponding exposed part of the wire 14 and are firmly soldered to it using for example a tin-lead solder. This connection, which is resistant to corrosion without any restrictions, is additionally covered by means of a plastic insulating compound 72. After placing, joining and screwing the two collar parts 36 and 38, into which the free ends of the bridging cable have been threaded in advance through the corresponding holes, the plastic insulating compound is pressed into the recesses 74 of the collar parts, which recesses in this embodiment have a conical shape. This conical shape is thus hermetically sealed on all sides preventing air and/or moisture penetration.

I claim:

1. Process for making an electrically conducting connection between sections of cable ducts, each duct having at least one electrically conducting detector wire embedded in a wall of the duct and enclosed on all sides, said process comprising:
   fitting a collar comprising separable elements around each section of the cable ducts;
   placing a conducting cable between the collars of said sections and introducing the conducting cable inside the collars;
   achieving electrical contact between the detector wire in each section and the conducting cable;
   enclosing the electrical contact by placing a sealing material inside the collar;
   clamping the separable elements together.

2. Process for making an electrically conducting connection between two end sections of two cable ducts, each duct having at least one electrically conducting detector wire embedded in the constitutive material of the wall of the duct and enclosed on all sides, said process comprising:
   fitting a collar comprising separable elements around the end section of each cable duct;
   placing a conducting cable between both collars and introducing the conducting cable inside each collar;
   stripping off the end portion of the conducting cable inside each collar;
   melting away the constitutive material enclosing the detector wire over an appropriate length in the area surrounded by the collar in each section;
   soldering the detector wire to the end portion of the conducting cable in each collar, thus achieving an electrical contact;
   covering the soldered electrical contact with insulating plastic material in each collar;
   clamping the separable elements of each collar together.

3. Process for making an electrically conducting connection between sections of two cable ducts, each duct having at least one electrically conducting detector wire embedded in a wall of the duct and enclosed on all sides, said process comprising:
   fitting a collar comprising separable elements around the end section of each cable duct;
   placing a conducting cable between both collars and introducing the conducting cable inside each collar;
   providing cutting means in each collar;
   connecting said cutting means with said conducting cable;
   achieving knife contact between the cutting means and the detector wire in each collar by clamping the separable elements together.

4. A connector for making an electrically conducting connection between sections of cable ducts, each duct having at least one electrically conducting detector wire embedded in a wall of the duct and enclosed on all sides, said connector comprising:
   two collars, each collar comprising separable elements which can be closed around one of the cable duct sections;
   at least one electrical cable which makes an electrical connection between the two collars;
   means for achieving an electrical contact between the electrical cable and the detector wire within each collar;
   insulating sealing material enclosing said electrical contact;
   clamping means for closing the separable elements of each collar.

5. A connector for making an electrically conducting connection between sections of cable ducts, each duct having at least one electrically conducting detector wire embedded in a wall of the duct and enclosed on all sides, said connector comprising two collars, each collar comprising separable elements which can be closed around one of the cable duct sections, each collar having at least one knife contact which when the corresponding collar is closed cuts into the duct wall and makes contact with a detector wire, and at least one electrically conducting cable which makes an electrically conducting connection between one knife contact in one of the two collars and one knife contact in the other collar.

6. A connector according to claim 5, wherein the knife contact is a bushing-knife cutting in the conducting detector at two points separated from each other in the direction of the cable duct axis.

7. A connector according to claim 5, including a sealing system which outwardly seals the point of contact between the particular knife contact and the detector wire.

8. A connector according to claim 7, wherein the sealing system comprises a sealing ring around the knife contact between the duct wall and the collar.

9. A connector for making an electrically conducting connection between sections of cable ducts, each duct having at least one electrically conducting detector wire embedded in material in a wall of the duct and enclosed on all sides, said connector comprising two collars, each collar comprising separable elements which can be closed around one of the cable duct sections and at least one electrical cable, which makes an electrical connection between the two collars, said cable having a stripped off end portion inside each collar; whereby electrical contact between the detector wire and the end portion of the conducting cable is made by soldering to form a soldered electrical contact, after that the material enclosing the detector wire is melted away over an appropriate length to allow said soldering; said connector further comprising clamping means for closing the separable elements of each collar.

10. A connector according to claim 9, further including insulating plastic material covering the soldered electrical contact.

* * * * *